United States Patent [19]

Groom

[11] Patent Number: 5,003,235
[45] Date of Patent: Mar. 26, 1991

[54] SINGLE ELEMENT MAGNETIC SUSPENSION ACTUATOR

[75] Inventor: Nelson J. Groom, White Marsh, Va.

[73] Assignee: The United States of America as represented by the Administrator of the National Aeronautics and Space Administration, Washington, D.C.

[21] Appl. No.: 405,154

[22] Filed: Sep. 11, 1989

[51] Int. Cl.$^5$ ............................................. H02K 41/00
[52] U.S. Cl. .................................... 318/135; 310/90.5
[58] Field of Search ................. 310/90.5, 12; 361/143, 361/146; 318/135, 632, 633; 335/234, 256, 266

[56] References Cited

U.S. PATENT DOCUMENTS 4,629,262 12/1986 Hamilton ........................... 310/90.5
4,642,501 2/1987 Kral et al. ......................... 310/90.5
4,726,640 2/1988 Iwama et al. ...................... 310/90.5
4,751,487 6/1988 Green, Jr. ........................... 335/234

Primary Examiner—Steven L. Stephan
Assistant Examiner—Judson H. Jones
Attorney, Agent, or Firm—Harold W. Adams; John R. Manning

[57] ABSTRACT

The invention, a single element magnetic suspension actuator with bidirectional force capability along a single axis, includes an electromagnet 11 and a nonmagnetic suspended element 12. A permanent magnet 13 mounted on the suspended element 12 interacts with a magnetic field established by the electromagnet 11 to produce bidirectional forces in response to a variable force command voltage $V_{FC}$ applied to the electromagnet 11. A sensor 14 measures the position of the suspended element 12 on the single axis which is a function of force command voltage $V_{FC}$.

10 Claims, 5 Drawing Sheets

SINGLE ELEMENT MAGNETIC SUSPENSION ACTUATOR

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

The invention is a single element magnetic suspension actuator and more particularly to a single element magnetic suspension actuator with bidirectional force capability along a single axis. Applications for the invention may include magnetic actuators for shape and figure control of antennas and precision segmented reflectors, and magnetic suspension for payload pointing, isolation, and control systems.

2. Description of the Prior Art

Typically, the force produced by a single magnetic suspension actuator element is an attractive force that is directly proportional to the square of the flux in the magnetic gap. The flux, under ideal assumptions, is directly proportional to the current in the actuator element coil and inversely proportional to the magnetic gap. In order to produce a bidirectional force, prior art has utilized two or more actuator element pairs acting together along a single axis. Many approaches for controlling the force produced by this type of actuator are known. For instance see U.S. Pat. Nos. 4,629,262 and 4,642,501 to Brian J. Hamilton and Kevin O. Kral, respectively.

A disadvantage of prior art devices is in the need for two or more elements controlled either differentially or one at a time in opposition to produce a bidirectional force along a given axis. This results in weight and volume disadvantages and configuration constraints in most applications.

OBJECT AND SUMMARY OF THE INVENTION

An object of the invention is to provide a single element magnetic suspension actuator with bidirectional force capability along a single axis. In general, the invention includes an electromagnet 11 and a nonmagnetic suspended element 12 having a permanent magnet 13 mounted thereon for providing a magnetic field that interacts with a magnetic field established by a variable force command voltage $V_{FC}$ applied to the electromagnet 11. The resulting bidirectional forces are sensed by measuring the change in position of the suspended element. A current feedback loop compensates for lag in movement of the suspended element effected by the inductance of the electromagnet.

BRIEF DESCRIPTION OF THE DRAWINGS

The above and numerous other objects and advantages of the invention will become apparent from the following description when read in view of the appended drawings wherein.

BRIEF DESCRIPTION OF THE INVENTION

Figure 1:
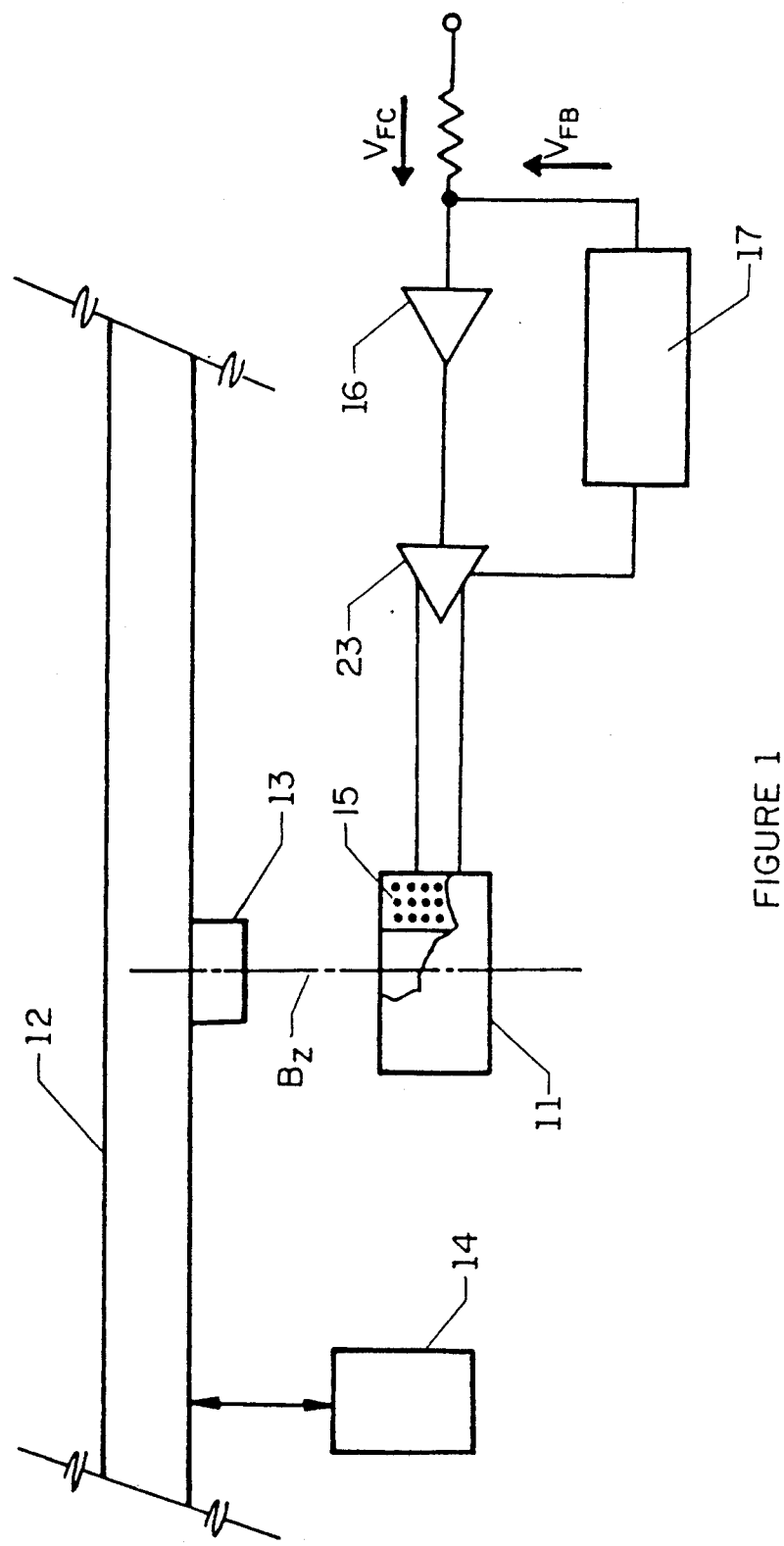
FIG. 1 is a schematic of a preferred embodiment of the invention utilizing current feedback.
Figure 2:
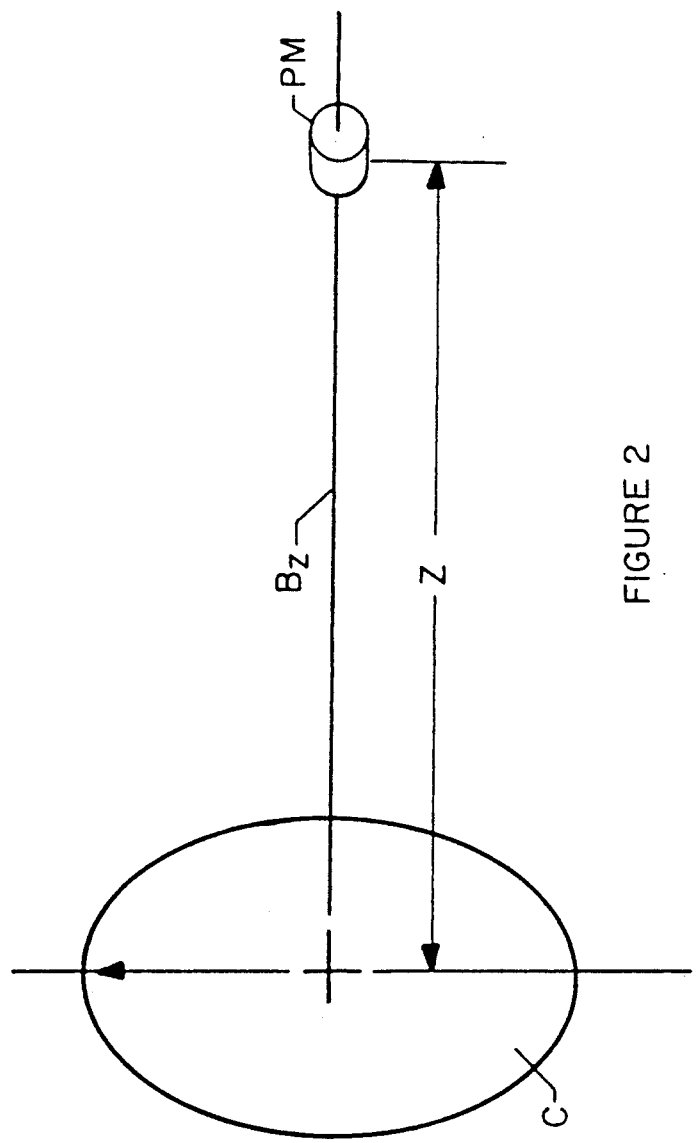
FIG. 2 illustrates a single turn electrical coil C representative of the principle of operation of the invention.
Figure 3:
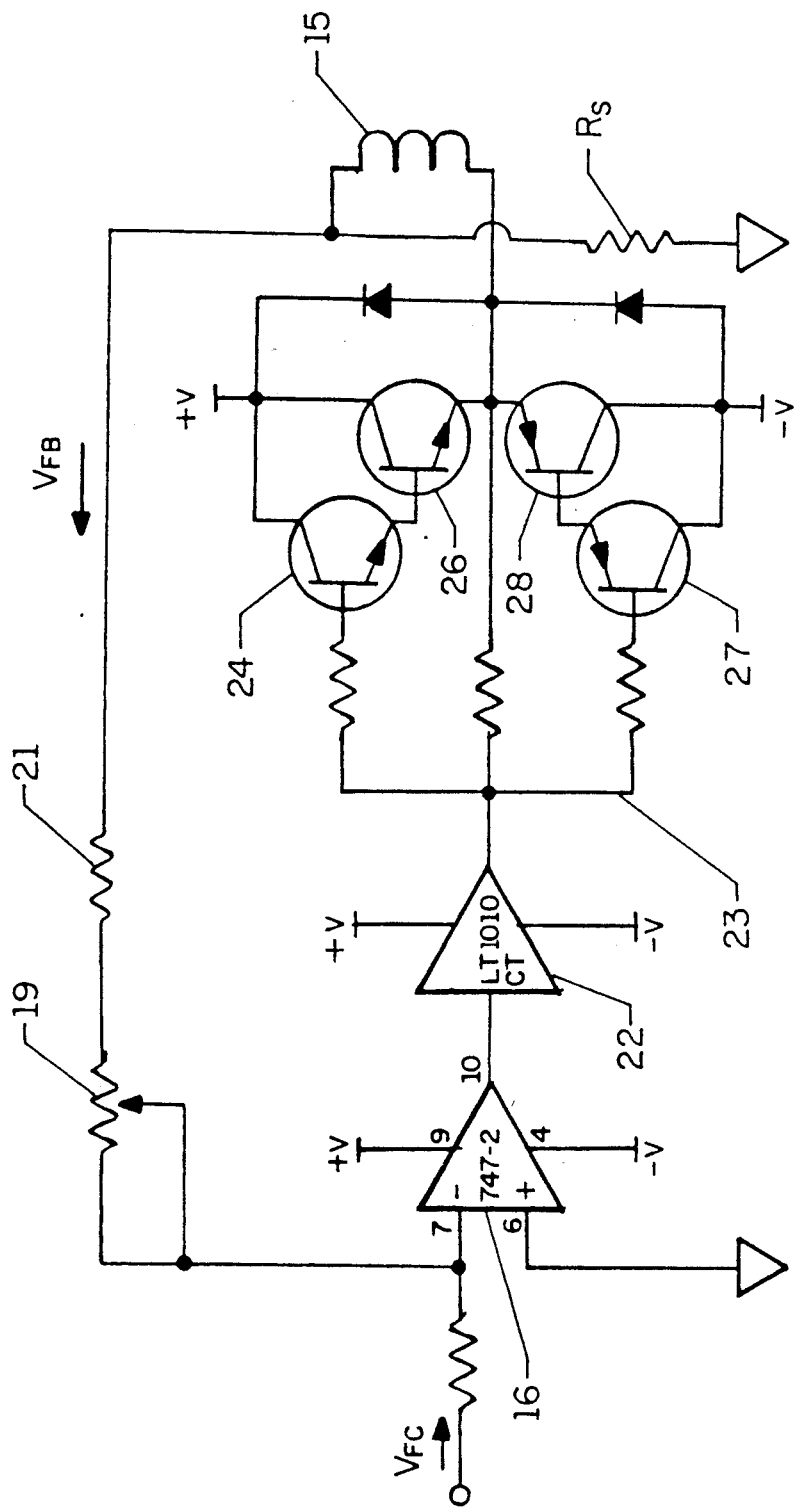
FIG. 3 is an electrical schematic of the preferred embodiment that includes current feedback.

Referring now to the drawings FIGS. 1-3 illustrate a preferred embodiment of the invention as generally comprising a circular electromagnet 11 having a longitudinal axis that represents a single axis $B_Z$, a nonmagnetic suspended element 12, a permanent magnet element 13 mounted on the suspended element 12 and positioned on the single axis $B_Z$ to provide a magnetic field for the electromagnet to interact with to produce bidirectional forces along the $B_Z$ axis in response to a variable force command voltage $V_{FC}$ connected to a coil 15 of electromagnet 11 by a first circuit means that includes a first conventional operational amplifier 16. A sensor 14 measures the change in position of the element 12 being controlled, the position being directly related to the force command voltage $V_{FC}$.

In order to describe the operation of the single element actuator, the simplified schematic of FIG. 2 showing a single turn coil C with radius r and a permanent magnet element PM located a distance z from the center of the coil C on the centerline through the coil C is illustrated. The flux density along the centerline $B_Z$, generated by the coil C in FIG. 2 can be written as:

$$B_Z = (\mu_0 i/2)(r^2/(r^2+z^2)^{3/2}) \qquad (1)$$

$B_Z$ at the center of the coil C, defined as $B_{ZO}$, becomes $$B_{ZO} = \mu_0 i/2r \qquad (2)$$

Equation (1) can be written in terms of the ratio z/r by factoring r out of the denominator $$B_Z = (\mu_0 i/2)(i/r[1+(z/r)^2]^{3/2}) \qquad (3)$$

From (2), (3) can be written as $$B_Z = B_{ZO}/(i+[z/r]^2)^{3/2}$$

The force on the element, along the z - axis, can be written as $$F_Z = (\text{Vol})M_Z \partial B_Z/\partial z \qquad (5)$$

where $M_Z$ is the magnetization of the permanent magnet element PM along the z - axis and Vol is the volume of the element. Taking $\partial B_Z/\partial z$ results in $$\partial B_Z/\partial z = (-3B_{ZO}/r)([z/r]/[i+(z/r)^2]^{5/2}) \qquad (6)$$

and the force becomes $$F_Z(i, z) = (\text{Vol})M_Z(-3\mu_0 i/2r^2)([z/r]/[i+(z/r)^2]^{5/2}) \qquad (7)$$

Linearizing $F_Z(i, z)$ about a nominal operating point $i_O$, $z_O$ results in $$\delta F_Z = K_i \delta i + K_Z \delta z \qquad (8)$$

where $$K_i = \partial F_z(i, z)/\partial i \, \big|_{i_o, z_o}, \, K_z = \partial F_z(i, z)/\partial z \, \big|_{i_o, z_o} \quad (9)$$

Taking the partial derivatives in (9) results in $$\partial F_z(i, z)/\partial i = (\text{Vol}) M_Z (-3\mu_o/2r^2)([z/r]/[1+(z/r)^2]^{5/2}) \quad (10)$$

and $$\partial F_z(i, z)/\partial z = (\text{Vol}) M_Z (-3\mu_o i/2r^3)([i-4(z/r)^2]/[i+(z/r)^2]^{7/2}) \quad (11)$$

Under the assumption that $i_o = 0$, the linearized force at the nominal operating point $z_o$ becomes $$\delta F_z = ([-3(\text{Vol})M_Z \mu_o/2r^2][(z_o/r)/(i+[z_o/r]^2)^{5/2}]) \delta i \quad (12)$$

An implementation of the actuator using a current feedback loop means 17 is shown in FIG. 3. This circuit uses readily available components and is set up in a current feedback configuration. The first operational amplifier 16 input sums the input force command voltage $V_{FC}$ with a voltage feedback $V_{FB}$ generated by current flowing through a sense resistor $R_S$ in series with the coil 15 of electromagnet 11. The input resistor 18 and feedback resistors 19 and 21 are selected to provide a current gain of 1 Amp/volt in the current feedback loop 15. A conventional buffer amplifier 22 provides the necessary drive current for output stage 23 which is a complementary configuration consisting of power transistors 24 and 26 and power transistors 27 and 28.

The use of the current feedback loop 17 provides more accurate control of current in the electromagnet 11 which is important since the force produced by the single element actuator at a nominal operating point is directly proportional to current (see equation 12). The current feedback provided by the loop 15 also reduces the effect of lag in movement of the suspended element 12 introduced by the coil inductance.

A typical application for a single element actuator in accordance with the invention may be a magnetic suspension and pointing platform with six degree of freedom (DOF) control such as the Annular Suspension and Pointing System (ASPS). The current ASPS configuration uses six magnetic suspension actuators to achieve six DOF control. Currently these six actuators are conventional actuators which requires two electromagnet elements per actuator to produce bidirectional force.

Substituting a single element actuator in accordance with the invention for the prior art design eliminates the need for a total of six electromagnet elements, thus resulting in a significant reduction in power and weight requirements. A similar single actuator arrangement may be used to control a precision reflector segment which is part of a large segmented reflector.

Thus, the invention, uses a single actuator element or coil in combination with a source of magnetic flux on the suspended element, such as permanent magnet material, to provide a bidirectional force along a single axis. Alternate embodiments of the invention could include multiple elements interacting with the same flux source attached to the suspended element, for example a single permanent magnet core of a given shape, to produce multiaxis forces and torques. Also, the implementation of the single element actuator, as disclosed, uses current feedback to control the flux produced by the coil.

Figure 4:
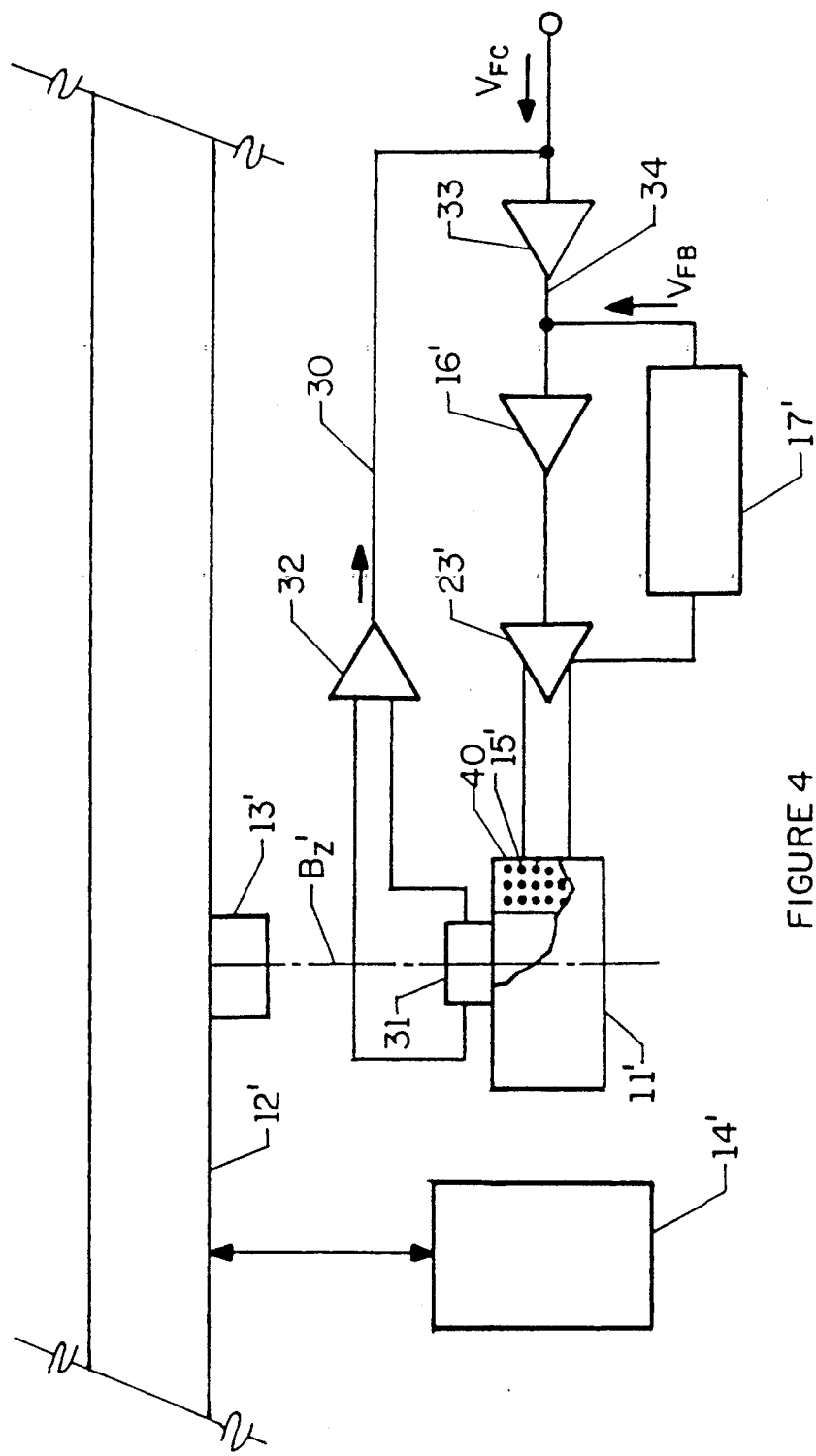
FIG. 4 is a schematic of an alternative embodiment utilizing both current and flux feedback.
Figure 5:
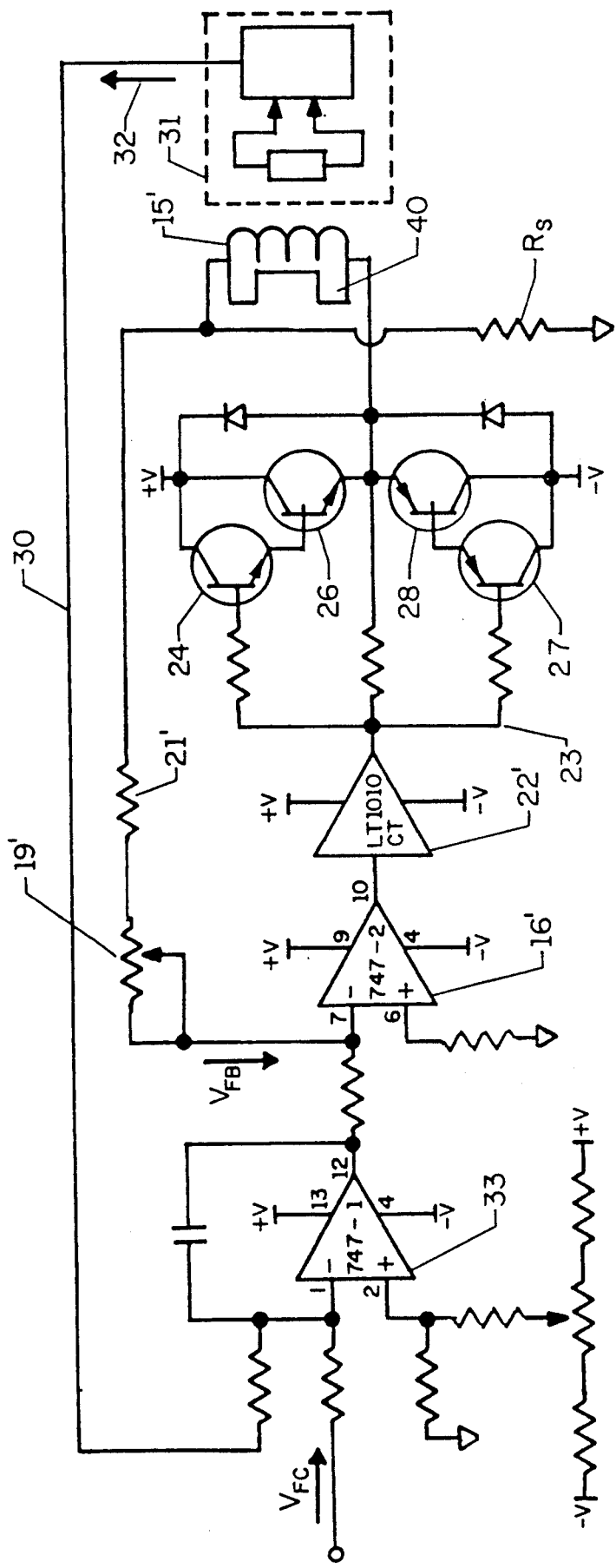
FIG. 5 is an electrical schematic of the invention illustrated in FIG. 4.

An alternative embodiment using flux feedback in combination with current feedback is shown in FIGS. 4 and 5. As shown in FIG. 4 a flux feedback loop means 30 includes a conventional Hall Effect sensor 31 mounted on electromagnet 11 and arranged to sense the flux produced by the electro- magnet. As shown in FIG. 5 the output 32 of the sensor 31 which may be an integrated circuit combining am amplifier and Hall Effect device is summed with the force command voltage $V_{FC}$ in a second operational amplifier 33 the output 34 of which is summed with the feedback voltage $V_{FB}$ from the sense resistor $R_S$ in operational amplifier 16.

The alternative embodiment may be used to compensate for nonlinearities in a single element actuator using a coil with a magnetic core 40 rather than an air core which is linear and requires no flux feedback compensation.

The use of a magnetic core in the electromagnet 11 increases the maximum flux possible for a given current. However, when a magnetic core 40 is used Equation 1 no longer holds as hysterisis and other nonlinearities are introduced by the magnetic core. Using flux feedback loop 30 insures that the current through the coil of electromagnet 11 is adjusted to the proper value to produce a commanded flux density. Current feedback loop 17 provides accurate control of the coil current within the flux feedback loop 30.

While preferred embodiments have been described in detail, numerous changes in modification can be made within the principle of the invention which is to be limited only by the scope of the impending claims.

What is claimed is:

1. A single element magnetic suspension actuator for producing bidirectional forces along a single axis comprising:

an electromagnet having a longitudinal axis that represents said single axis;

a detached single non-magnetic suspended element spaced from said electromagnet;

a permanent magnet mounted on said single non-magnetic suspended element and positioned on said single axis;

first circuit means for applying a variable force command voltage $V_{FC}$ to said electromagnet to produce opposing directional forces on said single non-magnetic suspended element; and means for sensing the resulting change in position of said single non-magnetic suspended element as a function of said force command voltage $V_{FC}$.

2. The invention as defined in claim 1 wherein said electromagnet includes an electrical coil.

3. The invention as defined in claim 2 wherein said first circuit means includes a first amplifier means and a sense resistor means series connected to said electrical coil of said electromagnet.

4. The invention as defined in claim 2 wherein said electromagnet further includes a magnetic core surrounded by said electrical coil.

5. The invention as defined in claim 2 including a current feedback loop connected around said amplifier means.

6. The invention as defined in claim 5 wherein said first amplifier means is a first operational amplifier.

7. The invention as defined in claim 4 including flux feedback loop means for compensating for non-linearities in flux density introduced by said magnetic core.

8. The invention as defined in claim 7 including a Hall Effect sensor means for sensing magnetic flux produced by said electromagnet and providing an output representative thereof.

9. The invention as defined in claim 8 including a second operational amplifier for summing said output of said Hall Effect sensor means and said force command voltage $V_{FC}$.

10. The invention as defined in claim 9 wherein said second operational amplifier is series connected with said first operational amplifier.

* * * * *